United States Patent
Chao et al.

(10) Patent No.: US 7,581,147 B2
(45) Date of Patent: *Aug. 25, 2009

(54) RADIO RESOURCE CONTROL-SERVICE DATA UNIT RECEPTION

(75) Inventors: Yi-Ju Chao, Minnetonka, MN (US); Stephen E Terry, Northport, NY (US); Julio Dineiro, Smithtown, NY (US); James M. Miller, Verona, NJ (US); Carl Wang, Flushing, NY (US); Janet Stern-Berkowitz, Little Neck, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/073,971

(22) Filed: Mar. 7, 2005

(65) Prior Publication Data

US 2005/0153696 A1    Jul. 14, 2005

Related U.S. Application Data

(63) Continuation of application No. 10/226,082, filed on Aug. 22, 2002, now Pat. No. 6,874,113.

(60) Provisional application No. 60/322,664, filed on Sep. 17, 2001.

(51) Int. Cl.
   *G01R 31/28* (2006.01)
   *H03M 13/00* (2006.01)

(52) U.S. Cl. .................. 714/712; 714/776; 714/748

(58) Field of Classification Search .............. 714/746, 714/748–749, 750, 712, 752, 776; 370/242, 370/235, 469, 473
See application file for complete search history.

(56) References Cited

U.S. PATENT DOCUMENTS

| | | | |
|---|---|---|---|
| 3,743,819 A | 7/1973 | Kapsambelis et al. | |
| 5,845,086 A | 12/1998 | Doebrich et al. | |
| 6,038,436 A * | 3/2000 | Priest | 455/343.3 |
| 6,145,109 A * | 11/2000 | Schuster et al. | 714/752 |
| 6,223,324 B1 | 4/2001 | Sinha et al. | |
| 6,424,637 B1 | 7/2002 | Pecen et al. | |

(Continued)

FOREIGN PATENT DOCUMENTS

EP    0 973 294 A2 *    1/2000

(Continued)

OTHER PUBLICATIONS

Stevens, W. Richard "The Protocols" TCP/IP Illustrated, vol. 1, pp. 148-149 and 267-269, 1994.*

(Continued)

*Primary Examiner*—Phung M Chung
(74) *Attorney, Agent, or Firm*—Volpe and Koenig, P.C.

(57) ABSTRACT

A method for receiving a segmented communication begins by periodically transmitting the segmented communication. The segmented communication is received and each segment of the segmented communication is examined to determine if the segment is valid. If the segment is valid, then the segment is stored. If the segment is invalid, then the invalid segment is identified. The segmented communication is retransmitted and received. Only the identified invalid segments of the retransmitted communication are examined to determine if the previously invalid segments are now valid.

14 Claims, 4 Drawing Sheets

U.S. PATENT DOCUMENTS

| | | |
|---|---|---|
| 6,456,826 B1 | 9/2002 | Toskala et al. |
| 6,594,791 B2 * | 7/2003 | Sipola ..................... 714/748 |
| 6,615,045 B1 | 9/2003 | Rollender |
| 6,788,652 B1 | 9/2004 | Hwang |
| 6,874,113 B2 * | 3/2005 | Chao et al. ................. 714/748 |
| 6,925,096 B2 * | 8/2005 | Haartsen .................... 370/473 |
| 2002/0075873 A1 * | 6/2002 | Lindhorst-Ko et al. ...... 370/394 |

FOREIGN PATENT DOCUMENTS

| | | | |
|---|---|---|---|
| JP | 08-242476 | | 9/1996 |
| JP | 11-341534 | | 12/1999 |
| KR | 2000-65674 | | 11/2000 |
| KR | 2001-48181 | | 6/2001 |
| KR | 2001-59727 | | 7/2001 |
| TW | 435021 | | 5/2001 |
| WO | 00/21253 | | 4/2000 |
| WO | 00/45543 | * | 8/2000 |

OTHER PUBLICATIONS

Choi et al., "Multimedia Data Parsing and Reassembling for the zCas (Collaborative-works Assistant System) Under Group Environments"; Proceedings of the 1997 International Conference on Information, Communications and Signal Processing, Singapore, Sep. 1997; pp. 1663-1667.

* cited by examiner

RADIO RESOURCE CONTROL-SERVICE DATA UNIT RECEPTION

CROSS REFERENCE TO RELATED APPLICATIONS

This application is a continuation of U.S. patent application Ser. No. 10/226,082, filed Aug. 22, 2002, issued as U.S. Pat. No. 6,874,113 on Mar. 29, 2005, which claims priority from U.S. Provisional Patent Application No. 60/322,664, filed Sep. 17, 2001.

BACKGROUND

The Universal Mobile Telecommunications Systems (UMTS) network architecture, illustrated in FIG. 1, includes a core network (CN) 2, a UMTS Terrestrial Radio Access Network (UTRAN) 3, and at least one User Equipment (UE) 18, (only one UE 18 being shown for simplicity). The two general interfaces are the Iu interface between the UTRAN and the core network as well as the radio interface Uu between the UTRAN and the UE.

The UTRAN consists of several Radio Network Subsystems (RNSs) 10, 11. They can be interconnected by the Iur interface. Each RNS 10, 11 is divided into a Radio Network Controller (RNC) 12, 13 and several base stations (Node Bs) 14-17. The Node Bs 14-17 are connected to the RNCs 12, 13 by the Iub interface. One Node B 14-17 can serve one or multiple cells.

The UTRAN 3 supports both FDD mode and TDD mode on the radio interface. For both modes, the same network architecture and the same protocols are used.

Communication between the Node Bs 14-17 and the UEs 18 over the radio interface Uu is conducted using a Radio Interface Protocol. The Radio Interface Protocol Stack architecture is illustrated in FIG. 2. As those skilled in the art would realize, the design of the Radio Interface Protocol Stack 20 is divided into three layers: the physical layer (L1) 21, the data link layer (L2) 22, and the network layer (L3) 23. L2 is split into four sublayers: the Medium Access Control (MAC) 24, the Radio Link Control (RLC) 25, the Broadcast/Multicast Control (BMC) 27, and the Packet Data Convergence Protocol (PDCP) 26.

L3 23 contains the Radio Resource Control (RRC) 28. The RRC handles the control plane signaling of L3 between the UTRAN 3 and the UEs 18. It is also responsible for configuration and control of all other protocol layers in the UTRAN 3 and for controlling the available radio resources. This includes assignment, reconfiguration and release of radio resources, as well as continuous control of the requested Quality of Service.

The Radio Link Control (RLC) layer 25 provides transparent, unacknowledged or acknowledged mode data transfer to the upper layers. The acknowledged mode transfer uses a sliding window protocol with selective reject-automatic repeat request.

The MAC layer 24 maps the logical channels of the RLC 25 on the transport channels, which are provided by the physical layer. The MAC layer 24 is informed about resource allocations by the RRC 28, and mainly consists of a multiplexing function. The priority handling between different data flows, which are mapped onto the same physical resources, is also done by the MAC layer 24. The function and operation of the BMC 27 and the PDCP 26 are well known to those of skill in the art and will not be explained in greater detail herein.

The physical layer 21 is responsible for the transmission of transport blocks over the air interface. This includes forward error correction, multiplexing of different transport channels on the same physical resources, rate matching, (i.e., matching the amount of user data to the available physical resources), modulation, spreading and radio frequency RF processing. Error detection is also performed by the physical layer 21 and indicated to the higher layers 22, 23.

The data flow through L2 22 is shown in FIG. 3. The higher layer Protocol Data Units (PDUs) are passed to the RLC layer 25. In the RLC layer 25, the Service Data Units (SDUs) are segmented and concatenated. Together with the RLC header, the RLC PDUs are built. No error detection code is added in the RLC layer 25. For transparent-mode RLC, no segmentation on the RLC layer 25 is performed and neither the RLC header nor the MAC header are added to higher layer PDUs.

In the MAC layer 24, only a header is added. This header can contain routing information which describes the mapping of logical channels to transport channels. On common channels, a UE identification can also be included.

In L1 21 (the physical layer), a CRC is added for error detection purposes. The result of the CRC check in the receiver is passed to the RLC layer 25 for control of retransmissions.

In current UMTS TDD or FDD systems, a radio resource control service data unit (RRC-SDU) may be sent in RLC transparent, unacknowledged or acknowledged modes between the UTRAN-RRC and the UE-RRC. The acknowledged mode will not be discussed hereinafter. However, when an RRC-SDU is transported in the transparent or unacknowledged modes, the RLC and MAC layers of the receiving side are not aware of the RRC-SDU. Therefore, any errors in the received RRC-SDU caused during transmission or by other sources, must be performed at the RRC layer, instead of at the lower layers.

The RRC-SDU may be transmitted in several individual segments known as transport blocks (TB). An example of an RRC-SDU is the broadcast control channel system information blocks (BCCH-SIB).

In the case of the BCCH-SIB, from the UTRAN-RRC to the UE broadcast control functional entity (UE-BCFE), TBs associated with this SIB are repeatedly retransmitted. SDU version indications are identified by "value tags". When the value tag does not change, the UE 18 assumes that the UTRAN is repeatedly sending identical BCCH-SIBs. If there are changes in the BCCH-SIB transmitted from the UTRAN 3, the UTRAN 3 uses the value tag to indicate to the UE 18 that there has been a change. Scheduling information, when the TBs of a BCCH-SIB should arrive at the UE 18, and the version of the BCCH-SIB, are known to the UE 18 in advance of transmission from the UTRAN 3.

FIG. 4 is an illustration of the UE 18 receiving an L1 SDU. The SDU comprises the TB, which carries, for example, the BCCH-SIB; and a CRC, which is used by L1 of the UE 18 to perform transmission error detection. As illustrated, the TB may also include the system frame number (SFN), as is the case for a TB of the BCCH-SIB, which indicates the time when the TB should arrive at the UE 18. Alternatively, for a TB that does not explicitly contain the SFN, the SFN of arrival can be derived by L1 from physical layer timing. L1 of the UE 18 passes the TB, SFN and CRC result to the higher layers. However, since the RLC and MAC layers 25, 24 operate in transparent mode for broadcast channel (BCH) data, the TB is passed to the RRC layer.

Since TBs are often transmitted between the UE 18 and the UTRAN 3 in a fading environment, transmission of TBs is associated with a targeted probability of successful transmission/reception, for example ninety-nine percent (99%). If a BCCH-SIB consists of a large number of TBs, the probability of correctly receiving all of the TBs of a BCCH-SIB is approximated at 0.99 raised to the power of the number of TBs. For example, a BCCH-SIB of a broadcast control channel (BCCH) may need more than ten TBs to transmit; in this case, the probability of the UE 18 successfully receiving the BCCH-SIB is (0.99) to the 10, which is less than ninety percent (90%). Accordingly, the probability of successful reception of the BCCH-SIB decreases as the number of TBs increases.

In UMTS TDD or FDD systems, the time to successfully receive the SIBs determines the performance for many system functions. Additionally, to maintain proper performance of these system functions, SIB repetition rates may have to be increased to compensate for failed transmissions, which reduces radio resource efficiency and utilization.

FIGS. 5 and 6 are an illustration and a flow diagram, respectively, of a current method used for successfully receiving an RRC SDU transmitted by the UTRAN 3 to the UE 18. As shown, the UE-BCFE receives the RRC-SDU (Step 60) which, for purposes of this example, comprises 9 TBs, labeled from SFN=2 to SFN=18 at a repetition rate of 64 frames. The UE-BCFE reads the RRC-SDU and determines if there is a TB in error or missing from the RRC-SDU (Step 61). For purposes of this example, SFN 10 is assumed to have an error. Since an error exists in the received RRC-SDU, the UE-BCFE discards the entire RRC-SDU and waits the repetition rate, i.e. 64 frames, to receive another RRC-SDU carrying the same information (Step 62). Once again the UE-BCFE receives the RRC-SDU, comprising 9 TBs, labeled from SFN=66 to SFN=82 (Step 63), and determines if an error is present (Step 61). In this example, SFN 70 (SFN 6+64 (repetition rate)) has an error or is missing. If no error is found in the received RRC-SDU, the UE-BCFE successfully receives and decodes the RRC-SDU (Step 64). Otherwise, as in the present case, the UE-BCFE discards the entire received RRC-SDU (Step 62) comprising 9 TBs and waits the repetition rate to receive the next RRC-SDU (Step 63). This process continues until the UE-BCFE receives nine (9) consecutive TBs which are correct.

There are two areas of concern with this type of method for receiving the RRC-SDU from the UTRAN. The first area is in the latency of proper/correct reception, which results in reduced performance of system functions requiring system information and or increased reception, thereby reducing radio resource efficiency. The second is when the UE L1 is required to repeatedly receive, decode and process all TBs in the RRC-SDU each time there is an error, this results in high processing and battery costs.

Therefore, there exists a need for an improved UMTS TDD or FDD system.

SUMMARY

A method for receiving a segmented communication begins by periodically transmitting the segmented communication. The segmented communication is received and each segment of the segmented communication is examined to determine if the segment is valid. If the segment is valid, then the segment is stored. If the segment is invalid, then the invalid segment is identified. The segmented communication is retransmitted and received. Only the identified invalid segments of the retransmitted communication are examined to determine if the previously invalid segments are now valid.

A user equipment for receiving a periodically transmitted segmented communication includes a receiver, examining means, a memory, and identifying means. The receiver is used to receive the segmented communication. The examining means examines each segment of the segmented communication to determine if the segment is valid. The memory is used to store valid segments. The identifying means identifies invalid segments in the segmented communication, whereby during a subsequent transmission of the segmented communication, the examining means only examines the identified invalid segments.

DETAILED DESCRIPTION OF THE PREFERRED EMBODIMENTS

Figure 1:
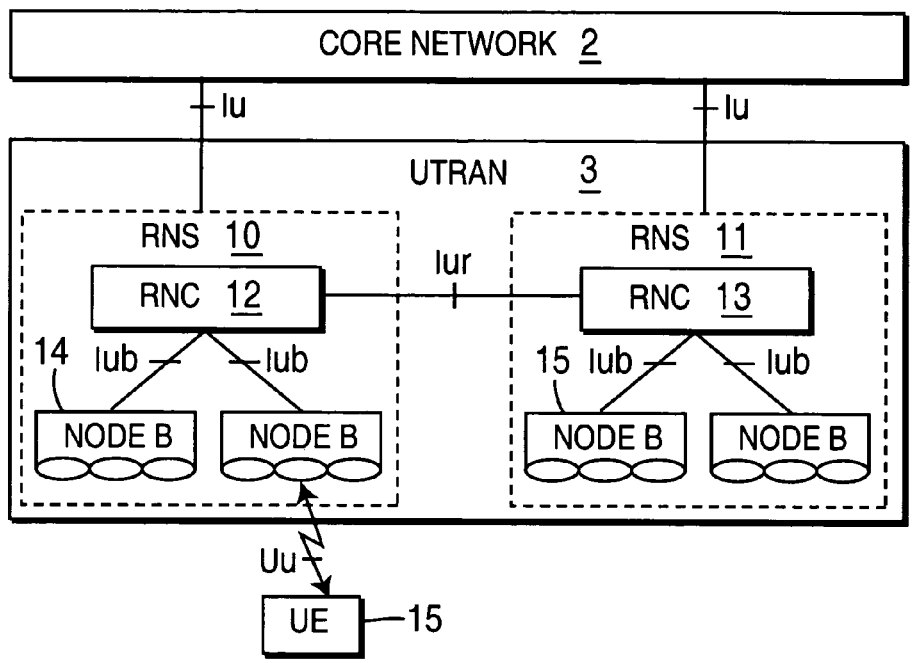
FIG. 1 is a block diagram of a universal mobile telecommunications system (UMTS).
Figure 2:
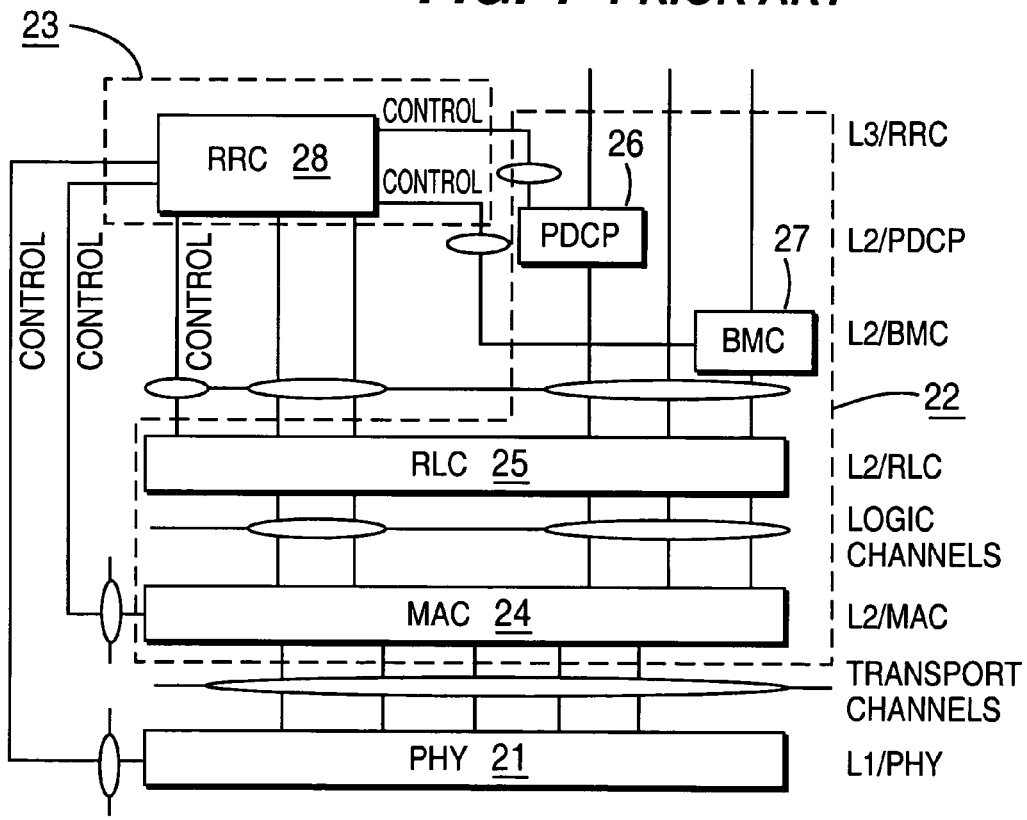
FIG. 2 is an illustration of a radio interface protocol stack architecture.
Figure 3:
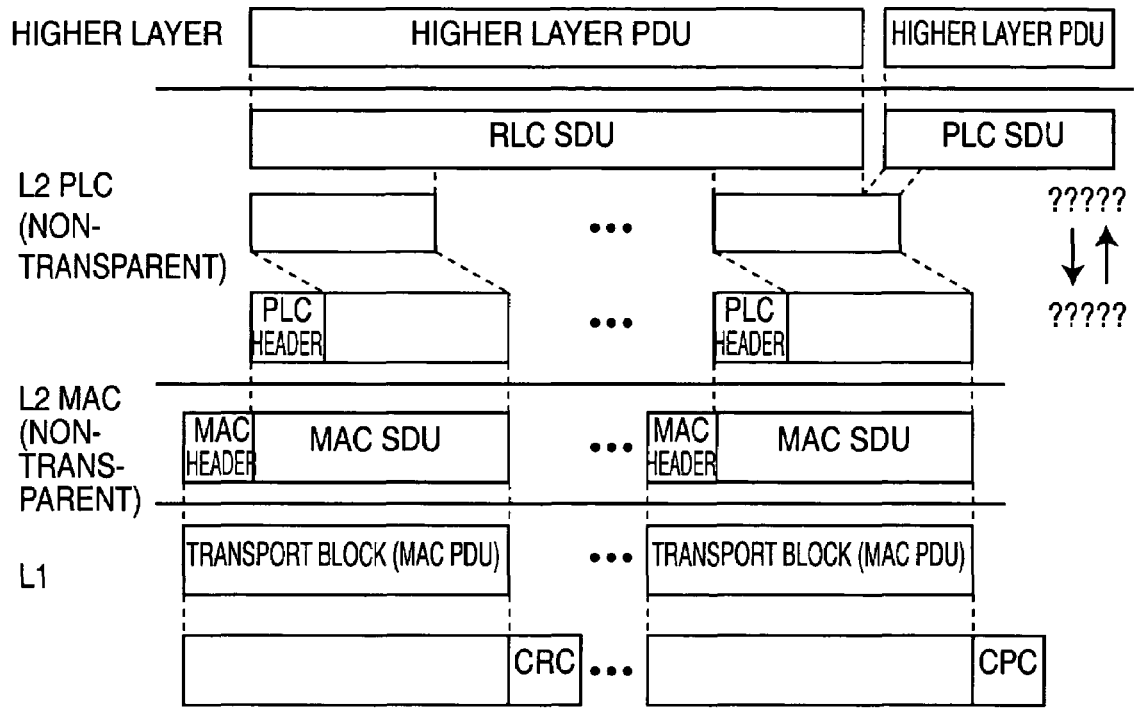
FIG. 3 is an illustration of the data flow through layer 2.

The preferred embodiment of the present invention will be described with reference to the drawing figures wherein like numerals represent like elements throughout.

Figure 4:
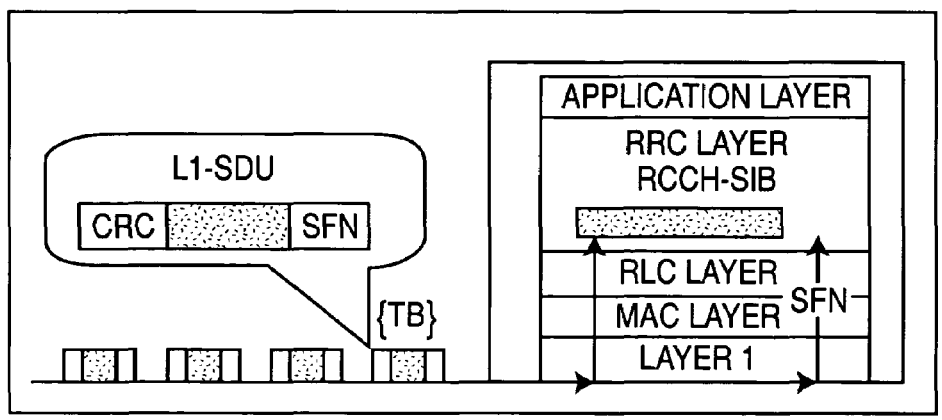
FIG. 4 is an illustration of a UE receiving a Layer 1 SDU.
Figure 5:
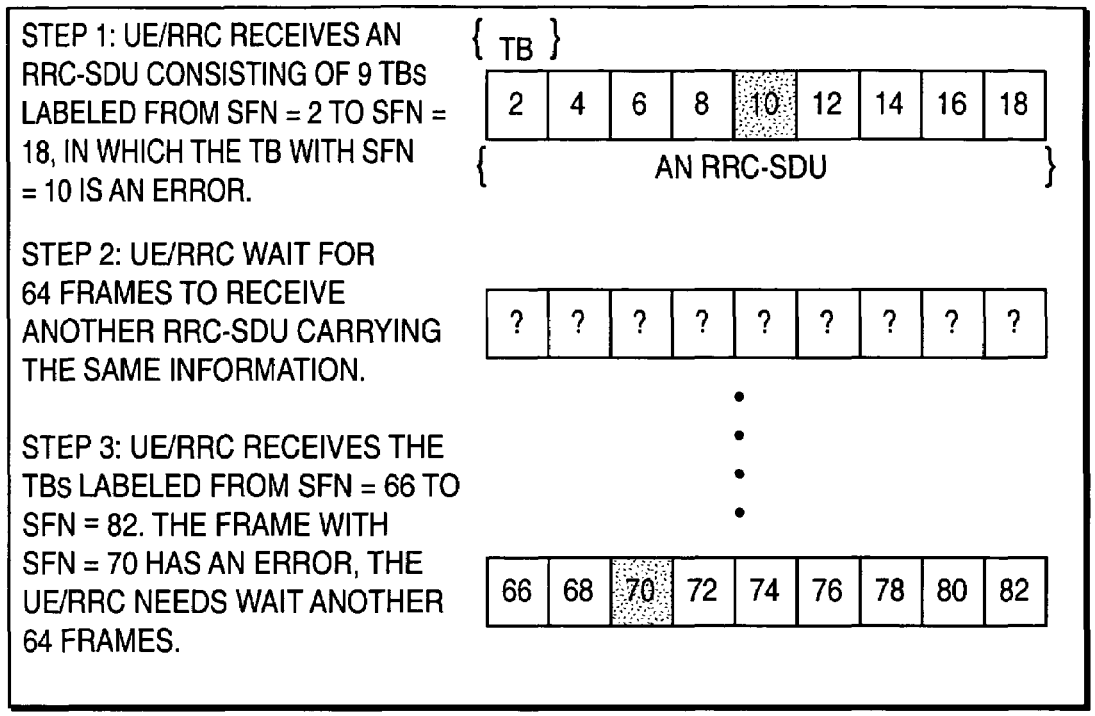
FIG. 5 is an illustration of a current method used for receiving the RRC-SDU.
Figure 6:
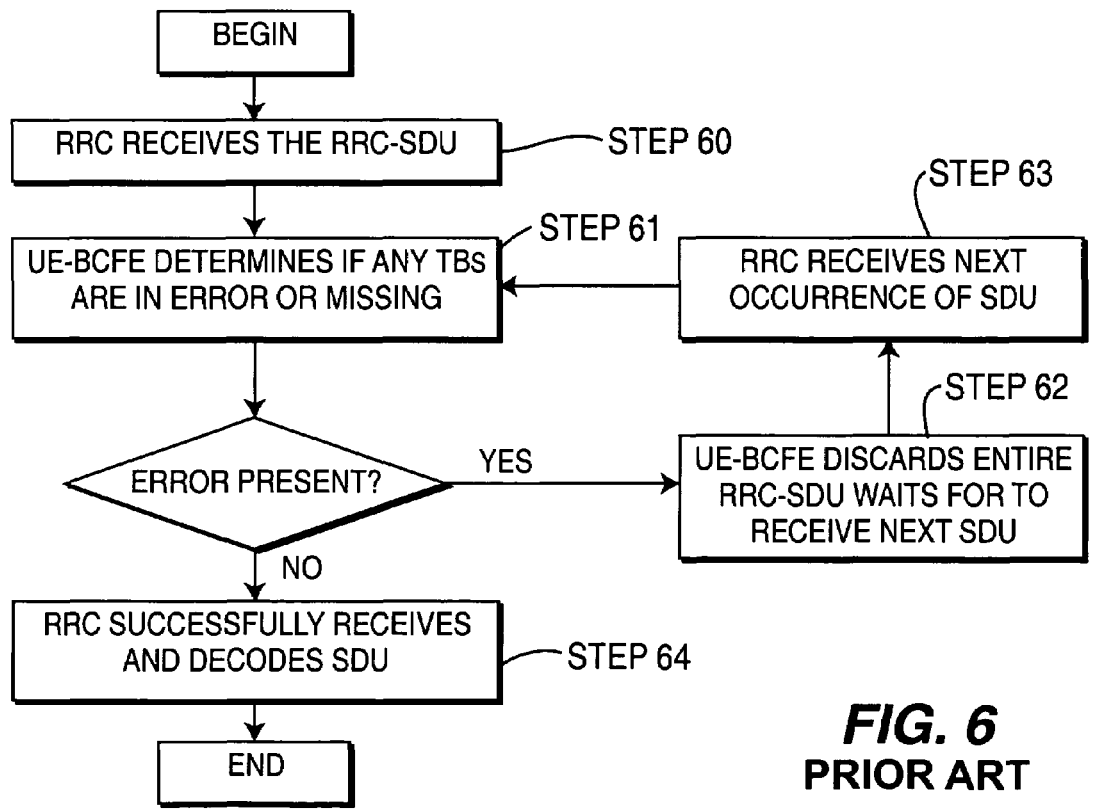
FIG. 6 is a flow diagram of a current method used for receiving the RRC-SDU.

Referring back to FIG. 4, the UE-L1 passes a received TB set, the SFN, and the CRC-error-detection result of each TB to the higher layers, (L2 and L3). Since the MAC and RLC layers 24, 25 operate in transparent mode for the BCCH, for example, the BCCH TBs can be forwarded to the L3 without processing. It is also possible that TBs with CRC errors are discarded by L2 or L3 before forwarding to L3.

Figure 7:
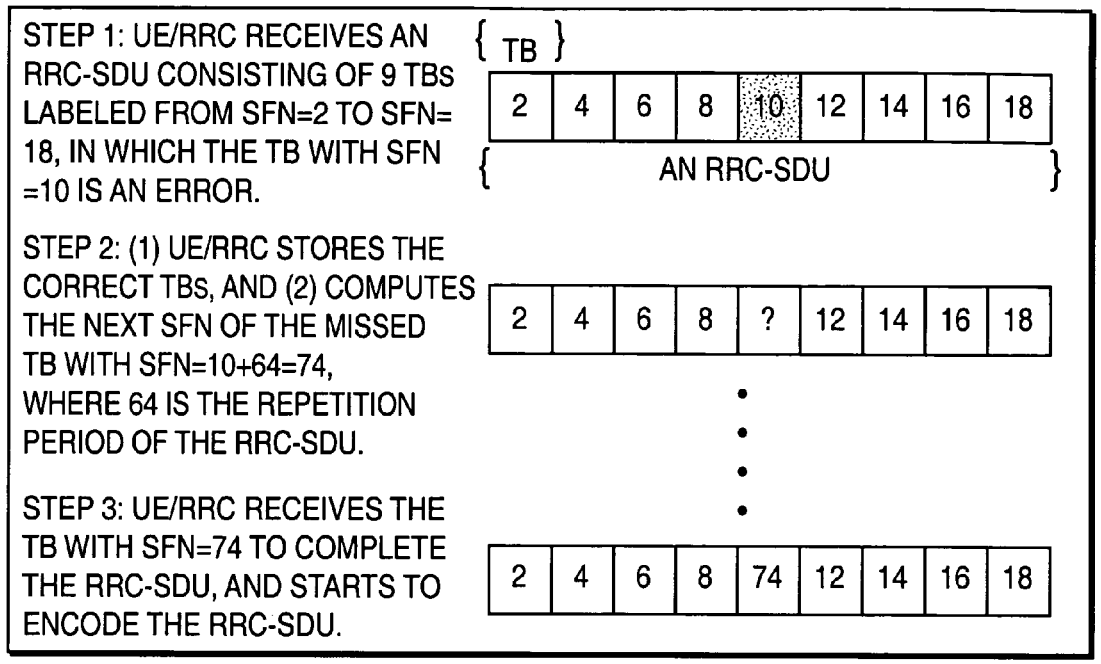
FIG. 7 is an illustration of a method for receiving the RRC-SDU in accordance with the preferred embodiment of the present invention.
Figure 8:
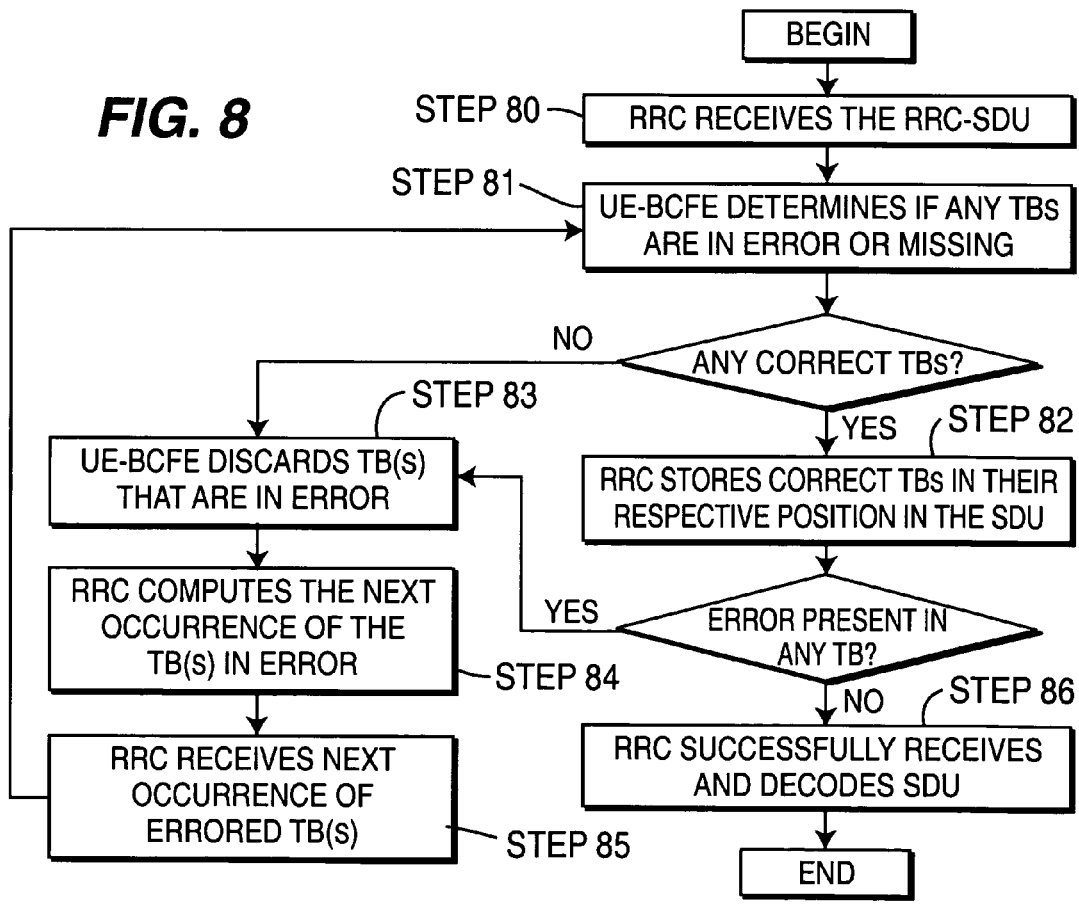
FIG. 8 is a flow diagram of a method for receiving the RRC-SDU in accordance with the preferred embodiment of the present invention.

FIGS. 7 and 8 are an illustration and flow diagram, respectively, of the method used in the preferred embodiment of the present invention. FIG. 7 illustrates an example scenario wherein an RRC-SDU is composed of nine (9) TBs with a repetition period of 64 frames. The UE-BCFE is informed in advance to expect the RRC-SDU from SFN=2 to SFN=to 18. The UE-BCFE receives the set of TBs corresponding to the RRC-SDU from one of the Node Bs 14-17 (Step 80) and determines whether one or more TBs are missed or have an error (Step 81).

In accordance with the preferred embodiment of the present invention, there are at least two ways for the UE-BCFE to make this determination. The first way is for the UE L1 to detect if there is a transmission error using the CRC error detection and inform the UE-BCFE of the SFN(s) of the errored TB(s). The second method is for the UE-BCFE to utilize the scheduling information and SFN(s) of correctly received TBs to determine TBs that have not been successfully received. Although only two methods for making such a determination of whether TBs are in error or missing have been disclosed herein, other methods may be utilized which fall within the scope of the present invention.

Once this determination has been made by the UE-BCFE, those TBs that are correct are stored by the UE-BCFE (Step 82) and the TBs which are missing or in error are discarded (Step 83). It should be noted that step 83 may be similarly accomplished by either L1 or L2 in advance of UE-BCFE processing. The RRC 28 then computes the next SFNs of all errored or missing TBs for the next RRC-SDU transmission (Step 84). Using the example illustrated in FIG. 7, the UE-BCFE would add the errored TB (SFN 10) to the repetition period of 64 to determine the next occurrence of the SFN, which in this example is 74. It is also possible that several TBs may be in error, and in this case, the SFN of each failed TB in the subsequent RRC-SDU transmission is calculated. Once the SFNs corresponding to each of the failed TBs in the subsequent transmission have been determined by the UE-BCFE, the RRC 28 informs L1 to only receive and decode the determined SFNs. In this example, only one TB corresponding to SFN 74 is identified for re-reception. Once the L1 receives the TBs for the calculated next SFNs, L1 forwards only the TBs, SFNs and CRCs to the RRC 28 of the particular SFNs requested by the RRC 28 (Step 85). If no error is detected in the set of retransmitted and received TBs, and no further TBs are missing from the RRC-SDU, the UE-BCFE stores the correct TBs in their place along with the other correct TBs (Step 82) and decodes the RRC-SDU (Step 86). If there are still TBs with CRC-errors for the received RRC-SDU, the RRC 28 determines such SFNs and repeats the process disclosed above (Step 84). This process continues until the complete set of TBs associated with the RRC-SDU have been stored by the UE-BCFE and processed by the RRC 28 (Step 86).

The present invention is applicable to all segmented RRC-SDUs that are periodically transmitted. The procedure starts upon detection of an updated value tag. If reception is in progress and a value tag is updated, all TBs of the previous set are deleted by the UE-BCFE.

One advantage of the present invention is that the successful RRC-SDU reception time, or (latency), is significantly reduced to the latency associated with the targeted error rate of the transmission of individual TBs between the UE 18 and the UTRAN 3, independent of the size of a RRC-SDU. Reduced reception latency improves the performance of UE functions associated with acquisition of system information such as faster cell search, reduced handover transmission break period, faster establishment of RAN connections and transitions between UE states.

Further, since the invention allows for more UE 18 efficient reception of system information, it is therefore possible to reduce scheduling rates, (i.e., the period of retransmission). This results in improved efficiency and greater utilization of limited BCCH physical resources.

Another advantage of the present invention is that the UE processing and battery consumption is reduced. With the ability to detect an individual TB reception error and the knowledge of TB scheduling information, the UE 18 can initiate reception only for the particular failed TBs rather than receiving the entire RRC-SDU. Additionally, UE battery and processing are further reduced due to the fact that successful RRC-SDU reception is achieved with fewer transmissions.

This invention can be applied to make the UE-BCFE receiving an RRC-SDU, such as the BCCH-SIB on the BCH faster and with reduced UE processing/battery consumption.

While the present invention has been described in terms of the preferred embodiment, other variations which are within the scope of the invention as outlined in the claims below will be apparent to those skilled in the art.

What is claimed is:

1. A method for receiving a segmented communication, comprising:
   periodically receiving the entire segmented communication;
   examining each segment of the segmented communication to determine if the segment is valid;
   if the segment is valid, then storing the valid segment;
   if the segment is invalid, then
      identifying the invalid segment;
      receiving an entire retransmitted segmented communication;
      examining only the identified invalid segments of the retransmitted segmented communication; and
      repeatedly receiving the entire segmented communication until all of the segments have been validly received.

2. The method according to claim 1, wherein said examining includes:
   detecting an error in a segment by using an error code included with each segment; and
   determining a segment number of each segment in which an error was detected.

3. The method according to claim 1, wherein the entire segmented communication is received after a predetermined repetition rate.

4. The method according to claim 1, wherein each segment includes a value tag.

5. The method according to claim 4, wherein each reception of the entire segmented communication has an equivalent value tag.

6. The method according to claim 4, wherein the stored valid segments are discarded if a received retransmission of the entire segmented communication has a different value tag.

7. The method according to claim 1, wherein the segmented communication includes broadcast control channel system information blocks.

8. A user equipment for receiving a periodically transmitted segmented communication, comprising:
   a receiver for receiving the segmented communication;
   an examining device for examining each segment of the segmented communication to determine if the segment is valid;
   a memory for storing the valid segments; and
   an identifying device for identifying invalid segments in the segmented communication, whereby during a subsequent reception of the entire segmented communication, said examining device only examines the identified invalid segments.

9. The user equipment according to claim 8, wherein said examining device is configured to:
   detect a segment number in a segment using an error code included with each segment; and
   determine a segment number of each segment in which an error was detected.

10. The user equipment according to claim 8, wherein each subsequent reception of the entire segmented communication occurs after a predetermined repetition rate.

11. The user equipment according to claim 8, wherein the segments include a value tag.

12. The user equipment according to claim 11, wherein each reception of the segmented communication has an equivalent value tag.

13. The user equipment according to claim 11, wherein said valid segments stored in said memory are discarded if a subsequent received retransmission of the entire segmented communication has a different value tag.

14. The user equipment according to claim 8, wherein the segmented communication includes broadcast control channel system information blocks.

* * * * *